(12) United States Patent
Touzani et al.

(10) Patent No.: US 9,172,257 B2
(45) Date of Patent: Oct. 27, 2015

(54) CONVERTER FOR BALANCING THE CELLS OF AN ELECTRIC BATTERY

(75) Inventors: Youssef Touzani, Chatou (FR); Morgan Almanza, Prades-le-lez (FR)

(73) Assignee: IFP Energies Nouvelles, Rueil Malmaison (FR)

( * ) Notice: Subject to any disclaimer, the term of this patent is extended or adjusted under 35 U.S.C. 154(b) by 211 days.

(21) Appl. No.: 13/991,429

(22) PCT Filed: Dec. 20, 2011

(86) PCT No.: PCT/EP2011/073334
§ 371 (c)(1),
(2), (4) Date: Jun. 4, 2013

(87) PCT Pub. No.: WO2012/084894
PCT Pub. Date: Jun. 28, 2012

(65) Prior Publication Data
US 2013/0249476 A1    Sep. 26, 2013

(30) Foreign Application Priority Data
Dec. 22, 2010   (FR) ..................... 10 61020

(51) Int. Cl.
*H02J 7/00* (2006.01)
*H01M 10/44* (2006.01)
(52) U.S. Cl.
CPC ........... *H02J 7/0014* (2013.01); *H01M 10/441* (2013.01); *H02J 7/0018* (2013.01); *Y02T 10/7055* (2013.01)
(58) Field of Classification Search
CPC ... H02J 7/0014; H02J 7/0018; H01M 10/441; Y02T 10/7055

USPC .......................... 320/107, 119, 121, 118, 120
See application file for complete search history.

(56) References Cited

U.S. PATENT DOCUMENTS

| 5,262,711 A | * | 11/1993 | Mori et al. | ..................... 322/28 |
| 5,982,143 A | * | 11/1999 | Stuart | ........................... 320/119 |
| 6,140,800 A | * | 10/2000 | Peterson | ...................... 320/118 |
| 2008/0278969 A1 | | 11/2008 | Bolz et al. | |

FOREIGN PATENT DOCUMENTS

| CN | 1275829 A | 12/2000 |
| CN | 1977439 A | 6/2007 |
| WO | 2010 108758 | 9/2010 |

OTHER PUBLICATIONS

International Search Report Issued Mar. 29, 2012 in PCT/EP11/73334 Filed Dec. 20, 2011.
Combined Chinese Office Action and Search Report issued Jan. 7, 2015 in Patent Application No. 201180057209.6 (with English language translation and English translation of categories of cited documents).

* cited by examiner

*Primary Examiner* — Richard Isla Rodas
*Assistant Examiner* — Nathaniel Pelton
(74) *Attorney, Agent, or Firm* — Oblon, McClelland, Maier & Neustadt, L.L.P.

(57) ABSTRACT

A balancing converter is connected to terminals of cells of an electric battery. The converter includes a quasi-resonant circuit and a pseudo-control circuit coupled by a transformer and implements soft-switching techniques through quasi-resonances.

7 Claims, 5 Drawing Sheets

Figure 1:
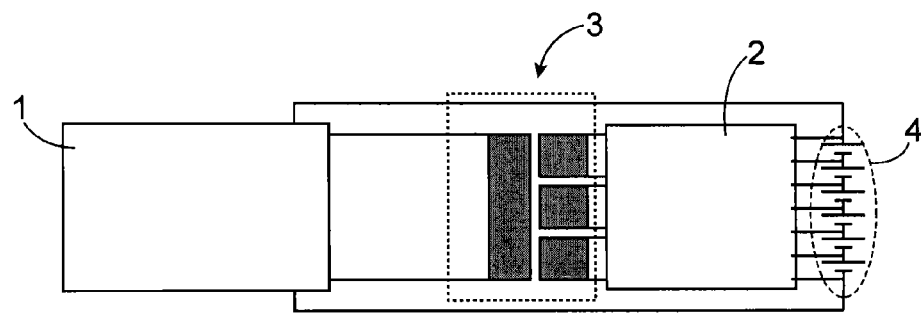

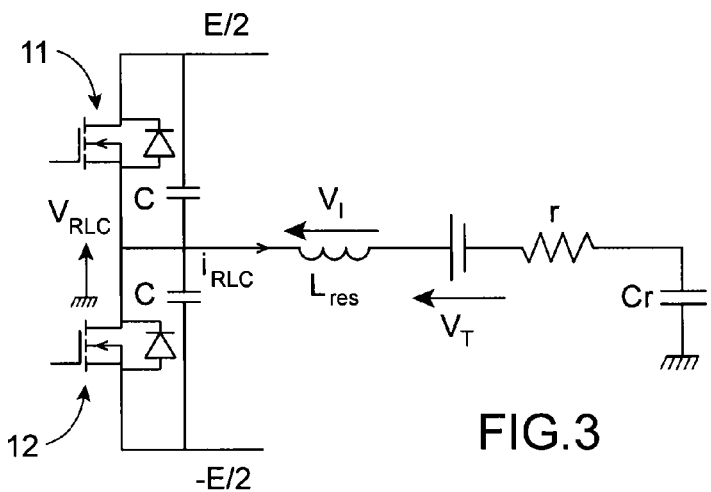
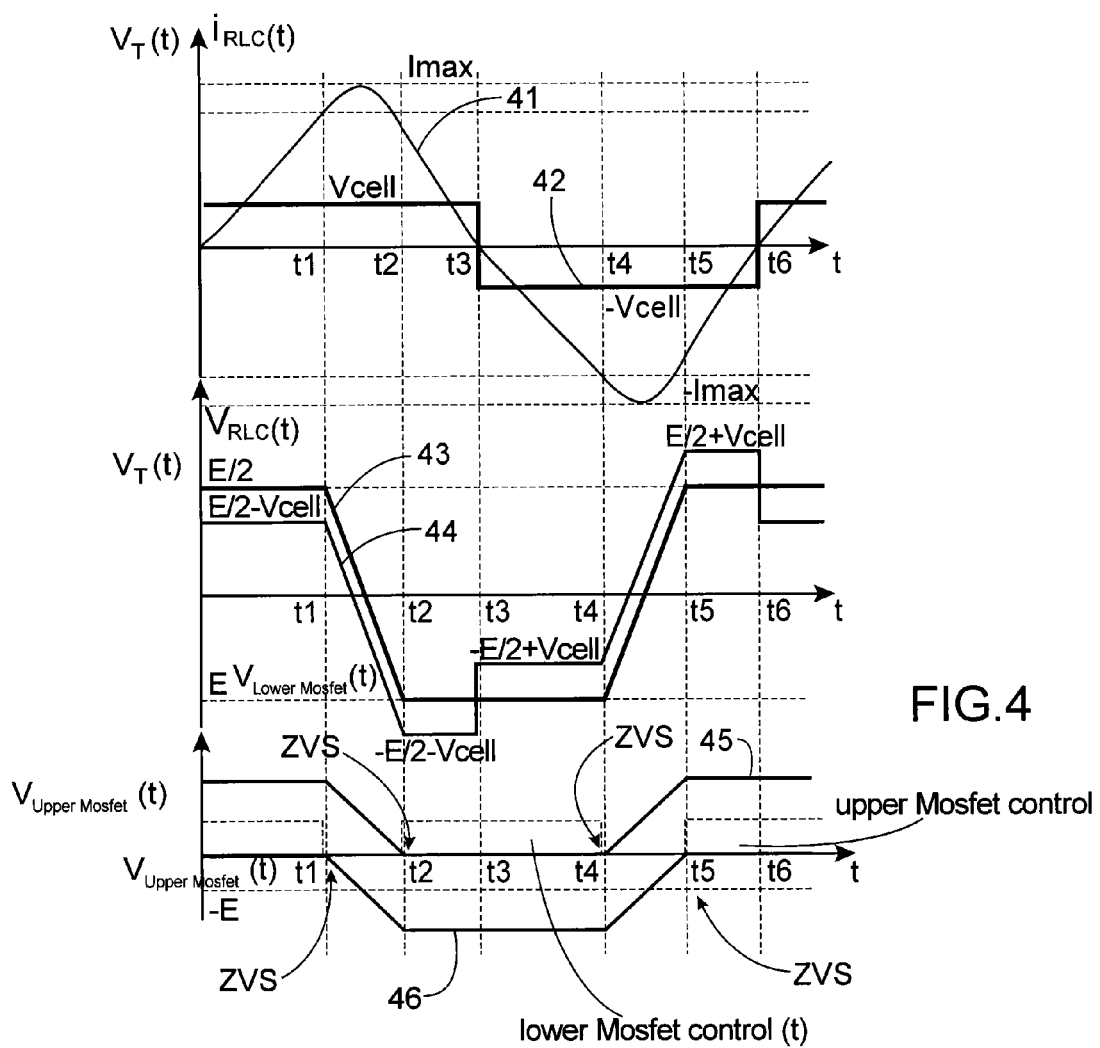
FIG.3
FIG.4

US 9,172,257 B2

CONVERTER FOR BALANCING THE CELLS OF AN ELECTRIC BATTERY

TECHNICAL FIELD

The invention relates to a converter for balancing the cells of the electric battery, in particular for batteries of hybrid and electrical motor vehicles.

STATE OF THE PRIOR ART

The way batteries are used in hybrid and electrical motor vehicles leads to severe charge and discharge cycles.

This way in which batteries are used accelerates the dispersion of the characteristics of the different cells constituting the battery, in particular the currency efficiency, causing charge imbalances over the battery's lifetime. The imbalance is particularly restrictive in the case of Li-ion batteries. It is indeed essential that the cells remain within a well-defined operating range.

To maintain the battery's capacity whilst extending its lifetime and its use in perfect safety, it is essential to balance the different cells constituting the battery. Balancing consists in transferring charges between the cells in order that they all have the same charge state.

A Li-ion battery consists of an assembly of cells of low-voltage (of the order of 3.6 V). To reach a higher voltage (of the order of 200 V to 300 V) all the cells are assembled in series. As soon as a cell goes outside its operating range the entire battery suffers as a result. To maintain the battery's highest efficiency the balancing system must apply at the level of each cell. However, reducing voltage is a factor which works against energy conversion.

In the literature several solutions are proposed to balance battery cells. These solutions may be categorised into two families: dissipative and non-dissipative. In the first family the solution is easy to implement, but the energy is merely dissipated. As for the second family, non-dissipative solutions may be classified in three categories:

A single converter switched to the cellules: it consists in switching the output of an insulated converter to the desired cell, using a matrix of switches, which is generally costly and complex.

Series converters: the principle consists in placing a converter between two successive cells. These structures generally include a large number of components, and allow transfers only between successive cells. Conversely, they are easier to control.

Parallel converters: they enable all the cells to be coupled directly to one another, by means of galvanic insulation. These structures are generally more complex to control. Since a single converter controls several cells, and requires the use of an isolating transformer.

Converters in parallel allow more flexible charge transfers than series structures. The transfers are more suitable and therefore fewer in number. Their major disadvantage is that they require a transformer, the weight of which is disadvantageous for on-board solutions. The solution is to increase the switching frequency. But this increase, combined with the low voltage of the elements, substantially increases the losses by switching and conduction, and also the electromagnetic disturbances.

DESCRIPTION OF THE INVENTION

To remedy the disadvantages of the current systems, a solution based on a parallel converter is proposed. To achieve improved efficiency, the proposed solution takes advantage of soft-switching techniques through quasi-resonances and techniques minimising passages through diode-type passive semiconductor elements. Indeed, the voltage drop in these elements (approximately 0.3 V in the case of Schottky diodes) represents approximately 10% of the cell voltage. In addition, the high number of cells may make the controls of the transistors for directing the transfers risky, complex and costly.

One object of the invention is a electric battery cell balancing converter, where the battery includes an even number N of cells connected in series, characterised in that the converter includes:

a first circuit called a quasi-resonant circuit,
  a second circuit, called a pseudo-control circuit, including switching modules, where each cell of the battery has a switching module connected in series with it,
  a transformer coupling the quasi-resonant circuit to the pseudo-control circuit, and including a primary winding and N/2 secondary windings, where one end of the primary winding is connected to a first terminal of the quasi-resonant circuit, and the other end is connected to a second terminal of the quasi-resonant circuit, and where a given secondary winding closes two electrical circuits, each of which consists of a switching module and a cell, connected in series;
  the quasi-resonant circuit includes an inductor connecting said first terminal to a middle-point of a first branch including a first element forming a switch, and a second element forming a switch, where said second terminal is connected to the middle-point of a second branch including a first capacitor and a second capacitor, where the first end of the first branch is connected to the first end of the second branch by a first electrical conductor, where the second end of the first branch is connected to the second end of the second branch by a second electrical conductor, and where the electrical conductors power the quasi-resonant circuit by a direct voltage;
  the elements forming switches of the quasi-resonant circuit include inputs for receiving signals sent by a driving circuit of the quasi-resonant circuit to close or open the elements forming switches;
  the switching modules of the pseudo-control circuit include inputs for receiving signals sent by a driving circuit of the pseudo-control circuit to put the switching modules into an on-state or off-state.

BRIEF DESCRIPTION OF THE ILLUSTRATIONS

Figure 2:
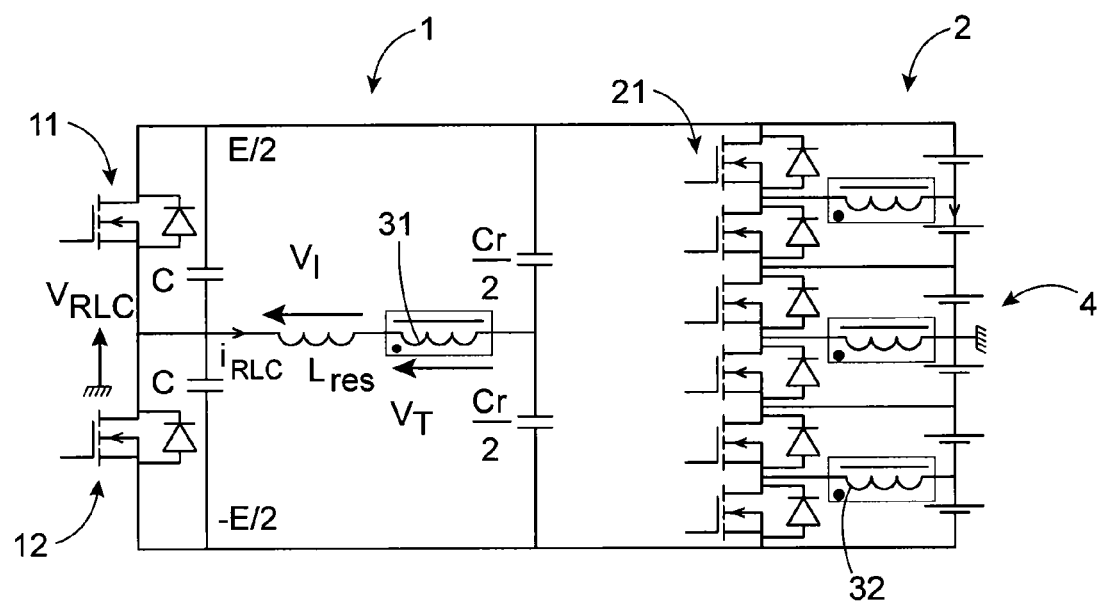
Figure 5:
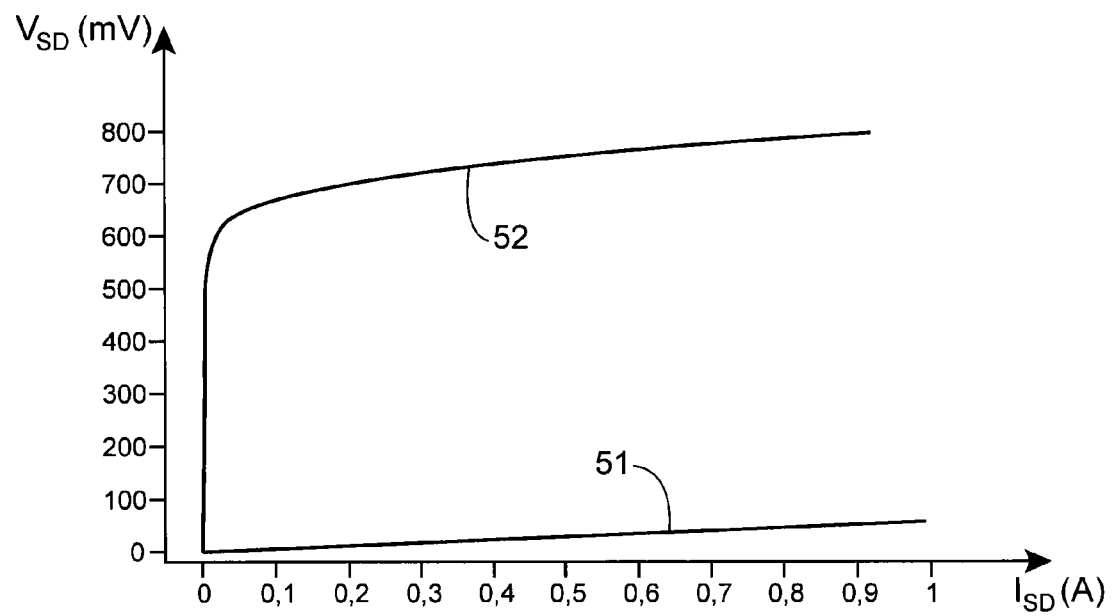
Figure 6:
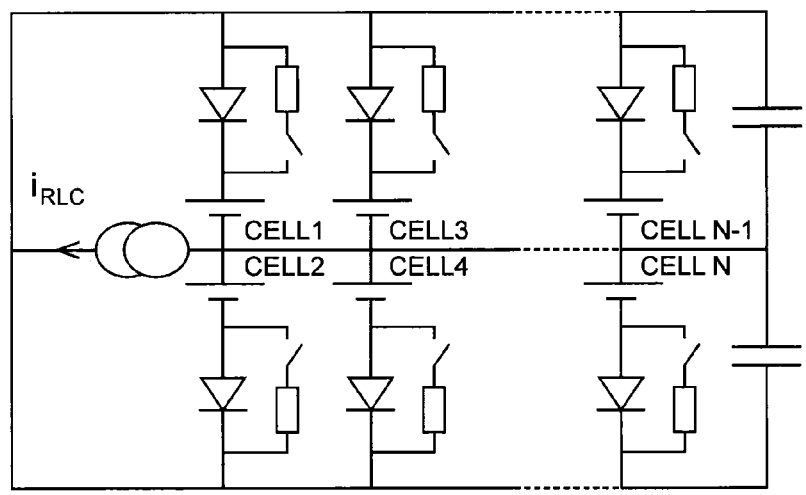
Figure 7:
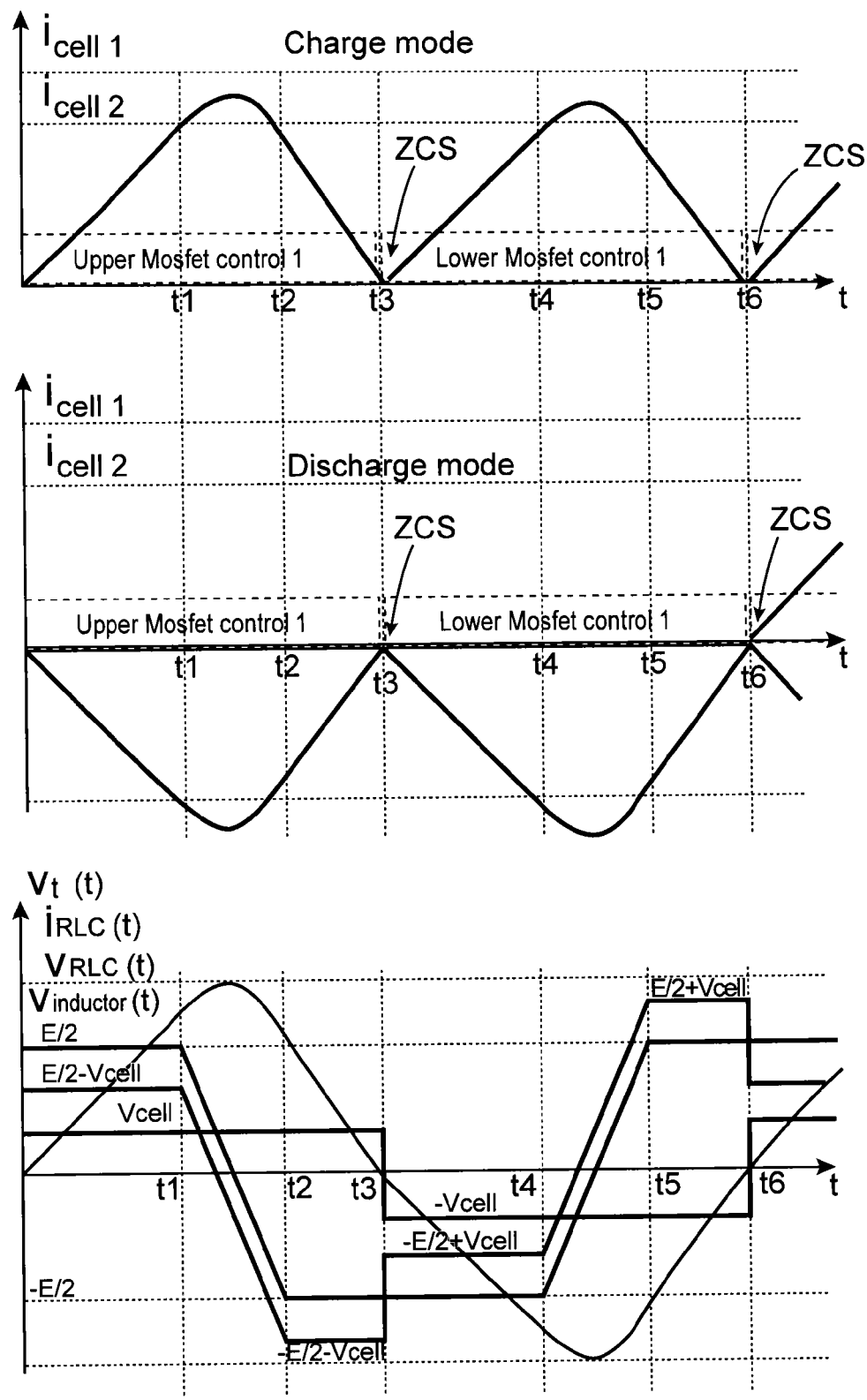
Figure 8:
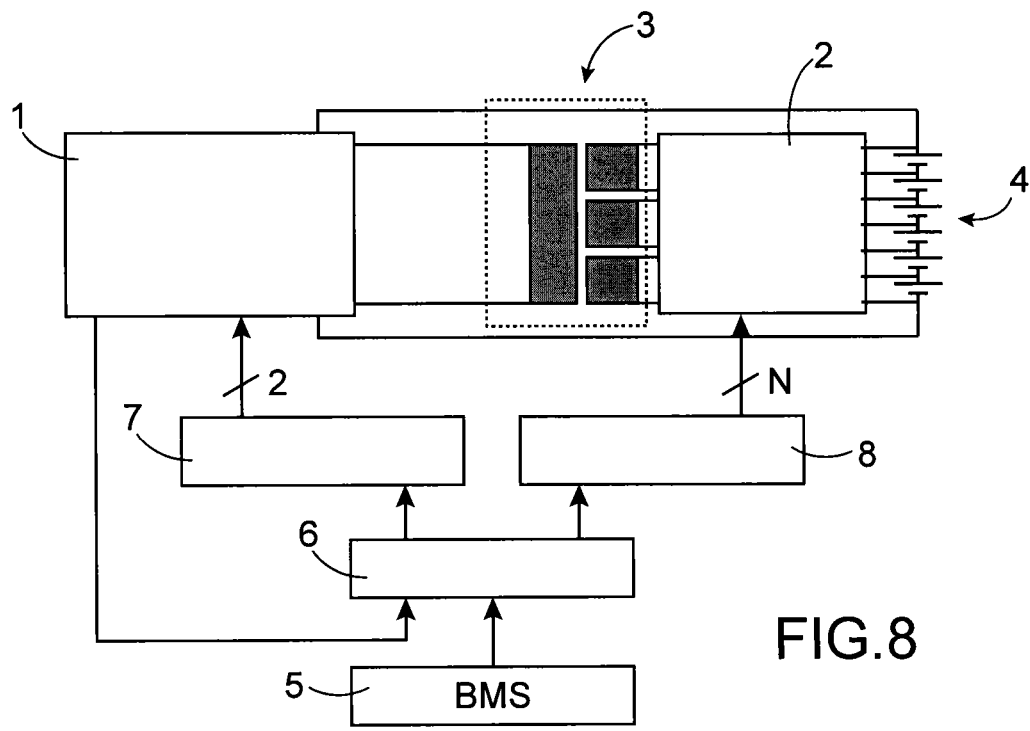
Figure 9:
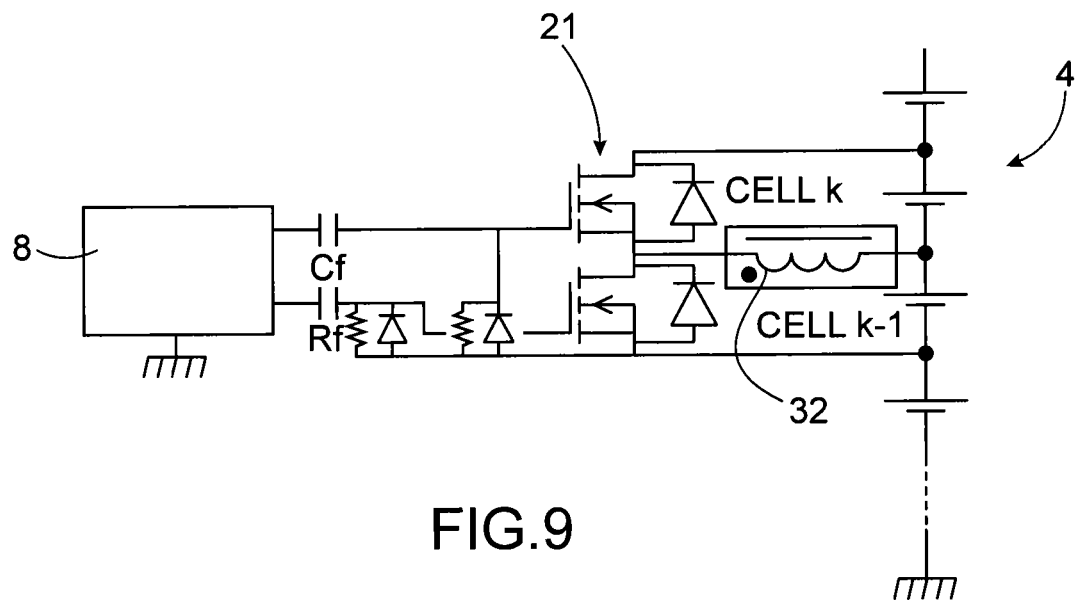

The invention will be better understood and other advantages and features will appear on reading the following description, which is given as a non-restrictive example, accompanied by the appended figures, among which:

FIG. 1 is an overview diagram of a system for balancing the cells of a Li-ion battery, according to the invention, FIG. 2 is a circuit diagram of an example of a system for balancing the cells of a Li-ion battery, according to the invention, FIG. 3 is a circuit diagram representing the equivalent model of the quasi-resonant circuit, FIG. 4 is a set of graphs shown with a simultaneous timing abscissa, and showing the waveforms in the quasi-resonant circuit in charge mode, FIG. 5 is a graph giving a compared representation of the voltage drop in a MOSFET transistor (with N channel), and in its intrinsic diode, FIG. 6 is a partial equivalent diagram of the pseudo-control circuit, FIG. 7 represents the waveforms in the pseudo-control circuit if the upper and lower cells are charged and discharged, and the waveforms of the quasi-resonant circuit in charge mode, FIG. 8 represents an overview diagram of the control of the quasi-resonant pseudo-control converter, according to the invention, FIG. 9 is a partial overview diagram of the driving circuit of the switching modules (MOSFET transistors) of the pseudo-control circuit.

DETAILED DESCRIPTION OF PARTICULAR EMBODIMENTS

The balancing system according to the present invention includes two portions coupled by a magnetic circuit (a transformer).

FIG. 1 is an overview diagram of a system for balancing the cells of a Li-ion battery, according to the invention. The system includes a quasi-resonant circuit 1 consisting of a Zero-Voltage-Switching (ZVS) H-shaped half-bridge. This circuit requires judicious dimensioning of the components, in order to limit the frequency range used, whatever current is requested. The system also includes a circuit 2 qualified as a "pseudo-control" circuit, according to the present invention. Circuit 2 simplifies control, and provides the possibility of transferring a current to the cells chosen with Zero-Current-Switching (ZCS). Circuits 1 and 2 are coupled by transformer 3.

From an electrical standpoint, quasi-resonant circuit 1 is powered directly by battery module 4. Multiple-winding transformer 3 enables the two circuits to be coupled. The quasi-resonant circuit imposes the current, while the pseudo-control circuit imposes the voltage on the transformer. To reduce the number of windings a positive current recharges the odd cells, and a negative current recharges the even cells. The transformer is used symmetrically. The pseudo-control circuit enables charging of the selected cell to be given priority.

FIG. 2 is a circuit diagram of an example of a system for balancing the cells of a Li-ion battery, according to the invention. Reference 1 designates the quasi-resonant circuit, reference 2 the pseudo-control circuit and reference 4 the battery module which includes six cells. The coupling transformer is represented in exploded fashion to simplify the diagram. It includes a primary winding 31 and three secondary windings 32. Each secondary winding 32 powers two battery cells. Compared to certain solutions of the known art, which use one winding per cell, the balancing system according to the present invention has the advantage that it reduces the quantity of copper in the transformer. Pseudo-control circuit 2 includes switches 21 on secondary windings 32, by this means allowing a secondary winding to be coupled to the chosen cell. It imposes the voltage on the transformer. The H-shaped half-bridge of the quasi-resonant circuit is connected to all the cells. Its role is to impose the current in the coupling transformer.

The Quasi-Resonant Circuit

In the example illustrated by FIG. 2, quasi-resonant circuit 1 includes:

- two MOSFET transistors 11 (or upper MOSFET) and 12 (or lower MOSFET), playing the role of elements forming switches with, in parallel for each, a capacitor C. These capacitors can be those which are intrinsic to these transistors. They may also be added components;
- two capacitors noted $C_r/2$, enabling a middle-point to be obtained in terms of the voltage of battery module 4;
- an inductor $L_{res}$, installed in series with primary winding 31, where the assembly connects the middle-point obtained by capacitors $C_r/2$ to the middle-point of transistors 11 and 12, and where inductor $L_{res}$ with capacitors C allows zero-voltage switching (ZVS).

The quasi-resonant circuit enables the sign of the voltage of winding $L_{res}$ to be controlled, whilst providing zero-voltage switching. The current is directed into the primary of the transformer, while the secondary circuit imposes the voltage of the transformer according to the direction state of the MOSFET transistors of the pseudo-control circuit.

It can be shown that the equivalent model of the quasi-resonant circuit is the circuit of FIG. 3. By merging the capacitors noted $C_r/2$, and by placing the voltage reference in the middle of the battery module, an equivalent capacity $C_r$ and a bus voltage of E/2 to −E/2 are obtained. Bearing in mind that the transformer is ideal, and that it switches positive currents to a cell of an odd number, and negative currents to a cell of an even number, it may be replaced by a variable voltage source, which is noted $V_T$ (voltage at the terminals of the transformer's primary windings). This voltage is equivalent to the voltage of a cell of the battery multiplied by the current sign. In charge mode the equivalent voltage is positive, and it is negative in discharge mode. The resistance of the transformer's winding is noted r. $V_I$ is the voltage at the terminals of inductor $L_{res}$.

From the equivalent diagram of FIG. 3 a structure is found allowing zero-voltage switching (ZVS) when the excitation frequency is greater than the resonance frequency.

FIG. 4 is a set of graphs shown with the same timing abscissa, showing the waveforms in the quasi-resonant circuit.

In FIG. 4 the upper graph represents two characteristics: current $i_{RLC}$ as a function of time (also see FIG. 3), designated by reference 41, and the voltage at the terminals of the primary winding of transformer $V_T$ as a function of time, designated by reference 42. $V_T$ may take the values + or $-V_{cell}$, where $V_{cell}$ is the voltage at the terminals of a cell of the battery.

The middle graph represents two characteristics: the voltage between transistors 11 and 12 and earth or $V_{RLC}$ (see FIGS. 2 and 3), designated by reference 43, and voltage $V_I$, designated by reference 44.

The lowest graph represents the voltages at the terminals of transistors 11 and 12. Curve 45 represents the voltage at the terminals of transistor 12 or lower MOSFET and curve 46 represents the voltage at the terminals of transistor 11 or upper MOSFET.

To determine the value of the components judiciously the system of equation (1) must be resolved.

$$\begin{cases} v_l = L_{res} \cdot \frac{di_{RLC}}{dt}; i_{RLC} = C_r \cdot \frac{dv_c}{dt}; v_r = r \cdot i_{RLC} \\ v_l + v_c + v_r + V_{cellsign(i_{RLC})} = v_{RLC} \end{cases} \quad (1)$$

The additional equation enabling system (1) to be resolved varies according to the state of the MOSFET transistors. Table 1 summarises this additional equation according to the different states of the MOSFET transistors (Upper and Lower) and the switching conditions. Where voltage "$V_f$" is the residual voltage of a diode in the on state.

TABLE 1

| t | $t_0 \to t_1$ | $t_1 \to t_2$ | $t_2 \to t_3$ $t_3 > t_4$ | $t_4 \to t_5$ | $t_4 \to t_5$ |
|---|---|---|---|---|---|
| additional equation | $V_{RLC}(t) = \dfrac{E}{2}$ | $i_{RLC} = 2 \cdot C \cdot \dfrac{dV_{RLC}}{dt}$ | $V_{RLC}(t) = -\dfrac{E}{2}$ | $i_{RLC} = 2 \cdot C \cdot \dfrac{dV_{RLC}}{dt}$ | $V_{RLC}(t) = \dfrac{E}{2}$ |
| State of upper Mosfet | closed | open | open | open | closed |
| State of lower Mosfet | open ↑ | open ↑ | closed ↑ | open ↑ | open |
| switching condition | $i_{RLC}(t) = I_{max}$ | $V_{RLC}(t) = -\dfrac{E}{2} + V_f$ | $i_{RLC}(t) = I_{min}$ | $i_{RLC}(t) = I_{min}$ | $V_{RLC}(t) = \dfrac{E}{2} - V_f$ |

When voltage E/2 is imposed from instant $t_0$ to $t_1$ the current increases. At instant $t_1$, when the current reaches Imax, upper Mosfet is ordered to open. Capacitor C restricts the increase of the voltage, and by this means allows zero-voltage switching. The energy stored in winding $L_{res}$ imposes continuity of the current which, through a transfer to capacitor C, allows a gradual reduction of the voltage between the drain and the source of lower Mosfet $V_{LowerMosfet}$.

At instant $t_2$, when voltage "$V_{LowerMosfet}$" reaches approximately –E/2, the Lower Mosfet is ordered to close.

From $t_2$ to $t_3$ the current decreases, whilst remaining positive. After this, from $t_3$ to $t_4$, it decreases and becomes negative. When the current is negative the procedure may be reproduced in the reverse direction.

The Pseudo-Control Circuit

The pseudo-control circuit, for a battery module including N cells, consists of:
  N/2 windings coupled to the magnetic circuit (secondary windings), where N is an even number,
  N MOSFET transistors with diodes in antiparallel.

In the known art balancing systems are found which use solutions which can be divided into two groups. In a first group the solution consists of a natural current switching system, produced through diodes, the states of which are caused by the voltages of the cells. In this case there is no control over the transfers, and the circuit must have a substantial degree of symmetry between the different secondaries. In a second group the switching of the current in the secondary is completely controlled through fully controllable switches. In this case, control tolerates no delay or mismatch.

The present invention enables a satisfactory compromise between the two existing solutions to be obtained. By providing a path of least resistance, it encourages the current to move towards the designated cell, hence the term "pseudo-control". Materially, the solution is implemented by means of MOSFET transistors. These components have the advantage that they have a current path, either through the diode when they are blocked (the voltage drop is then $V_f$), or through the conduction channel when they are controlled (the voltage drop is then $R_{dson} \cdot I \ll V_f$). It is the voltage difference between these two levels which provides control over the current.

FIG. 5 is a graph giving a compared representation of the voltage drop in a (N channel) MOSFET transistor, and in its intrinsic diode. Curve 51 represents voltage $V_{SD}$ of the transistor when current $I_{SD}$ passes through channel N of the transistor. Curve 52 represents voltage $V_{SD}$ of the transistor when current $I_{SD}$ passes through the diode. In the case of the present invention, the voltage drop caused by the diode is an element which is very unfavourable for the converter's efficiency. Indeed, a diode causes a voltage drop of the order of $V_f \approx 0.7V$ (silicon diode) or $V_f \approx 0.3V$ (Schottky diode). This voltage drop may vary from 10% to 30% of the cell voltage. By comparison, in the case of the MOSFET transistor (channel N), the voltage drop is of the order of 25 mV, i.e. less than 1% of the cell voltage.

FIG. 6 is a partial equivalent diagram of the pseudo-control circuit. If the case of cell number 1 "CELL1" is taken, when Upper Mosfet 1 is closed for a positive $i_{RLC}$ it is observed that the voltage imposed on the transformer's secondary becomes $V_{cell1} + R_{dson} \cdot I$. This voltage is lower than $V_{cell1} + V_f$, which causes the diodes to block. In the case of a negative current $i_{RLC}$ the principle is similar, but with a Lower Mosfet.

Conversely, in the case of a delay, an omission of the order or a voltage difference which is less than "$-V_f$" relative to the chosen cell, the current will pass principally into the diode. By this means, through this natural switching caused by the diodes, the system is able to prevent certain malfunctions or excessive voltage differences.

This possibility for control over a range of $V_f$ is in accordance with the goal of the present invention, of maintaining the same level of charge in each cell. Indeed, it results in approximately identical cell voltages.

In addition to directing the current into the designated cell, this technique reduces losses whilst reducing the voltage drop in the semiconductor elements.

FIG. 7 represents the waveforms in the pseudo-control circuit if the upper and lower cells are charged and discharged. At any given moment a single transistor is closed in the pseudo-control circuit.

As is shown by FIG. 7, the Mosfets are controlled according to the sign of current $I_{RLC}$ (positive or negative alternation). Switching occurs with each change of sign. A soft, zero-voltage switching (ZVS) is thus obtained. It can be seen, for example, that closing Upper Mosfet 1 on positive alternation allows cell "CELL1." to be recharged. Conversely, closing it on negative alternation causes this cell to be discharged. This principle applies to all the cells in the same way. The structure is thus able to discharge or charge the cells. Conversely, these procedures cannot be alternated at random. Indeed, two main conditions must be met:
  A flux in the magnetic circuit which is less than the saturation flux;
  A single cell must be selected at once.

The pseudo-control operates only during charging, since this is the natural way in which the structure operates. During discharge, a conventional operating mode is found, since the pseudo-control becomes a complete control.

The MOSFET transistors of the pseudo-control circuit switch with a zero current. All switching in the circuit is soft. The resonance frequency may thus be increased without risking a consequent increase of losses. The period of the signals is at around 2 μs to 5 μs, or between 200 kHz and 500 kHz. The volume of the magnetic circuit is small (a few cubic centimeters), which is perfectly suited to on-board applications.

Controlling the Pseudo-Control Quasi-Resonant Converter

FIG. 8 represents an overview diagram of the control of the quasi-resonant pseudo-control converter, according to the invention.

In FIG. 8 the same references have been used as in FIG. 1 to designate the different portions of the quasi-resonant pseudo-control converter, i.e. quasi-resonant circuit 1, pseudo-control circuit 2 and transformer 3. Battery module 4 which, in this example, consists of six cells, can also be recognised. The balancing structure is supervised by computer 5 or BMS (Battery Management System). The converter's balancing circuit receives the following instructions from computer 5: start, stop, charge or discharge operating mode, and selected cells.

In FIG. 8 reference 7 designates a driving circuit of the MOSFET transistors of quasi-resonant circuit 1, reference 8 designates a driving circuit of the MOSFET transistors of pseudo-control circuit 2. Reference 6 designates a control interface receiving at input the output of computer 5, and a signal representing a current measurement emitted by quasi-resonant circuit 1. The control interface manages driving circuits 7 and 8.

Driving circuit 7 of the quasi-resonant circuit may be produced in a conventional manner. The control signal may be generated by specialised circuits based on "Phase Shifted Resonant PWM" techniques.

The control signal of the MOSFET transistors of pseudo-control circuit 2 may be generated from a current transformer.

It is advantageous to install driving circuits for the MOSFET transistors of the pseudo-control circuit which are simple, fast, robust and of low power consumption. Bearing in mind that two difficulties in particular are encountered: the voltages in the Mosfets' sources are different, and the voltages of the sources of the "upper Mosfet$_k$" of the pseudo-control circuit are variable. The problem may appear difficult, since the solutions commonly used in power electronics are not very appropriate for this topology. The applied solution takes advantage of two of the degrees of freedom available in the topology of this example embodiment of the invention.

Since the grid voltages of the "lower Mosfet$_k$" of the pseudo-control circuit are fixed relative to the potential reference, pseudo-high-pass filtering is used. Since the control signal has a high frequency it is transferred in full by the high-pass filter (of the RC type), whereas the direct component due to the difference of potentials is not transmitted. The disadvantage of the high-pass filtering is that it will tend also to eliminate the direct component of the control signal. In order to be able to transmit the entire control signal a diode is installed in parallel with resistor R$_f$. The circuit shown in FIG. 9 is then obtained.

In FIG. 9, each high-pass filter consists of a capacitor C$_f$ and a resistor R$_f$. FIG. 9 shows the diode installed in parallel with resistor R$_f$.

The second degree of freedom is that, unlike conventional structures, the levels of the drain/source voltages are relatively low, generally between 0 V and 7 V. The grid voltage may be greater than the voltage between the drain and the source. One solution proposed by the invention consists in imposing a grid voltage higher than voltage Vds (between the drain and the source) in order to be able to reduce the control to the source voltage, of the "lower Mosfets$_k$", as shown in FIG. 9. This technique enables all the MOSFETS of the pseudo-control circuit to be controlled relative to a single potential reference.

The invention claimed is:

1. A cell balancing converter of an electric battery, wherein the battery includes an even number N of cells connected in series, the converter comprising:
    a first circuit as a quasi-resonant circuit;
    a second circuit, as a pseudo-control circuit;
    a transformer coupling the quasi-resonant circuit to the pseudo-control circuit, and including a primary winding and N/2 secondary windings, wherein one end of the primary winding is connected to a first terminal of the quasi-resonant circuit, and the other end is connected to a second terminal of the quasi-resonant circuit;
    the quasi-resonant circuit includes an inductor connecting the first terminal to a middle-point of a first branch including a first element forming a switch, and a second element forming a switch, wherein the second terminal is connected to a middle-point of a second branch including a first capacitor and a second capacitor, wherein the first end of the first branch is connected to the first end of the second branch by a first electrical conductor, wherein the second end of the first branch is connected to the second end of the second branch by a second electrical conductor, and wherein the electrical conductors power the quasi-resonant circuit by a direct voltage;
    the elements forming switches of the quasi-resonant circuit include inputs for receiving signals sent by a driving circuit of the quasi-resonant circuit to close or open the elements forming switches;
    wherein the pseudo-control circuit comprises:
    switching modules which include inputs for receiving signals sent by a driving circuit of the pseudo-control circuit to put the switching modules into an on-state or off-state each cell of the battery having a switching module connected in series with the respective cell of the battery, and
    a given secondary winding of the transformer closing two electrical circuits, each of which consists of a switching module and a cell, connected in series, and
    wherein the signals sent by the driving circuit of the pseudo-control circuit are transferred to the reception inputs of the switching modules by high-pass filters, where each high-pass filter is an RC filter including a capacitor and a resistor with a diode installed in parallel with the resistor such that an entire control signal is transmitted.

2. The balancing converter according to claim 1, in which the electrical conductors of the quasi-resonant circuit are connected to the electric battery.

3. The balancing converter according to claim 1, in which the elements forming the switches of the quasi-resonant circuit are MOSFET transistors.

4. The balancing converter according to claim 3, in which a further capacitor is connected in parallel to each MOSFET transistor.

5. The balancing converter according to claim 1, in which the capacitors of the second branch of the quasi-resonant circuit are of a same value.

6. The balancing converter according to claim 1, in which the switching modules of the pseudo-control circuit include MOSFET transistors with diodes installed in antiparallel.

7. The balancing converter according to claim 6, in which the MOSFET transistors of the pseudo-control circuit operate with a grid voltage higher than a voltage between a drain and a source.

* * * * *